United States Patent [19]

Smith, Sr.

[11] Patent Number: 5,192,107
[45] Date of Patent: Mar. 9, 1993

[54] TELESCOPIC TRUCK RACK

[76] Inventor: Delbert L. Smith, Sr., P.O. Box 249, Salem, N. Mex. 87941

[21] Appl. No.: 903,332

[22] Filed: Jun. 24, 1992

Related U.S. Application Data

[63] Continuation-in-part of Ser. No. 705,703, May 6, 1991, which is a continuation-in-part of Ser. No. 482,824, Feb. 21, 1990, abandoned.

[51] Int. Cl.$^5$ ............................................. B60P 3/00
[52] U.S. Cl. ....................................................... 293/3
[58] Field of Search ..................... 296/3; 224/42.45 R

[56] References Cited

U.S. PATENT DOCUMENTS

| | | | |
|---|---|---|---|
| 2,720,414 | 10/1955 | Hart | 296/3 |
| 2,947,566 | 8/1960 | Tower | 296/3 X |
| 3,475,046 | 10/1969 | Webster | 296/3 |
| 4,065,041 | 12/1977 | Stegarig et al. | 296/3 X |
| 4,211,448 | 7/1980 | Weston | 296/3 |
| 4,398,763 | 8/1983 | Louw | 296/3 |
| 4,405,170 | 9/1983 | Raya | 296/3 X |
| 4,439,087 | 3/1984 | Schink | 296/3 X |

Primary Examiner—Charles A. Marmor
Assistant Examiner—Gary C. Hoge
Attorney, Agent, or Firm—Richard C. Litman

[57] ABSTRACT

A truck rack includes a multi-sectioned frame assembly providing a front section and a rear section, each comprising pairs of upper and lower side rails, with the upper side rails extending significantly forward of the adjacent lower side rails. Substantially vertical uprights connect two sets of the upper and lower side rails to provide left-hand and right-hand frame units while a plurality of cross beams transversely span the two units. Provisions are made to permit vertical adjustment between the upper and lower side rails as well as to alter the length of the cross beams. Likewise, an adjustable telescopic fitting between the front and rear sections is provided. In this manner, the truck rack is readily adaptable, longitudinally and transversely, to position the lower side rails along the full length of the side walls of any pick-up truck bed and also, the height of the forwardly projecting portion of the upper side rails is variable so that this latter portion may be adjusted to accommodate alternately configured cap roof lines.

8 Claims, 2 Drawing Sheets

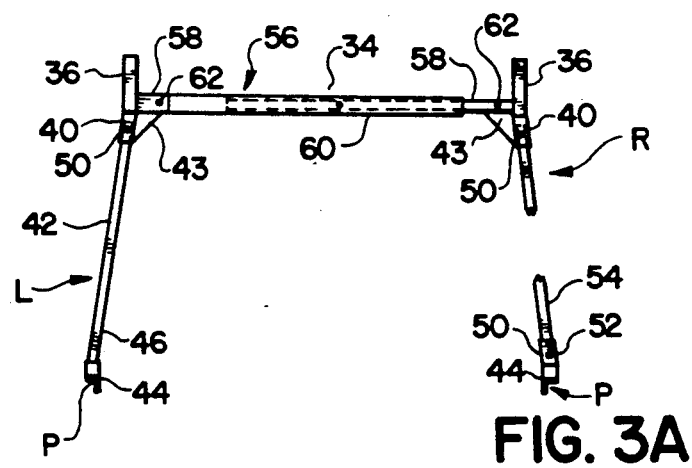
FIG. 3
FIG. 3A
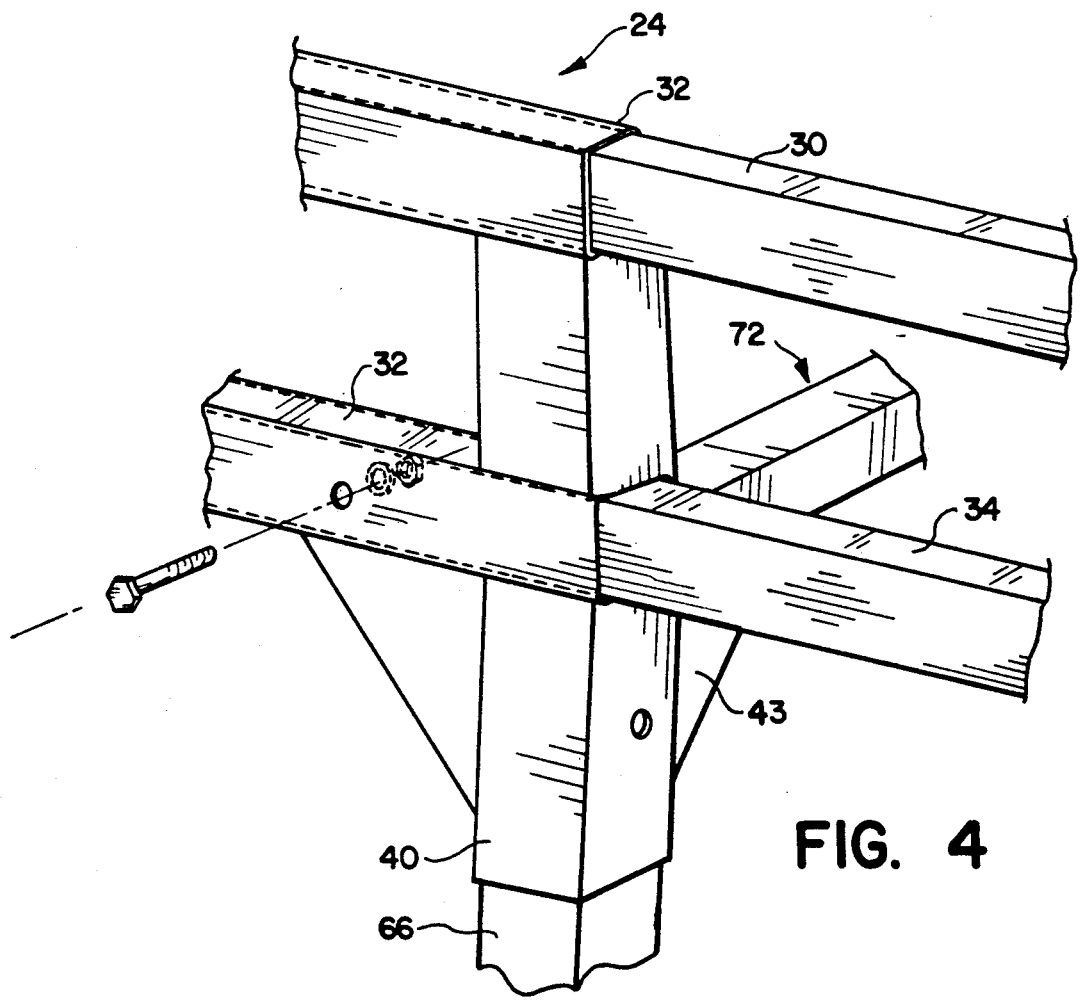
FIG. 4

TELESCOPIC TRUCK RACK

CROSS-REFERENCE TO RELATED APPLICATIONS

This is a continuation-in-part of my prior application, Ser. No. 07/705703 filed on May 6, 1991, pending, which is a continuation-in-part of application Ser. No. 07/482824, Feb. 21, 1991, now abandoned.

BACKGROUND OF THE INVENTION

1. Field of the Invention

The present invention relates to an accessory for pickup trucks and more particularly, to an improved rack assembly that readily permits adaptation to variously dimensioned pickup truck beds and which includes an uppermost rack area extending forwardly to overlie the truck cab.

Manufacturers of many accessory devices for pickup truck beds are faced with one common problem namely, what sizes of their particular device should they concentrate upon. The problem for makers of caps or enclosed tops for pickup trucks is serious as they must consider the multitude of combinations of lengths and widths of the numerous truck bodies being produced. For makers of rack assemblies wherein it is desired to permit the transport of lengthy ladders, pipes, conduits or the like, a third dimension is introduced since any rack having an overhead or elevated rack area must also accommodate the varying configurations of cab roof lines. A rack assembly that suitably addresses the latter situation should permit ready adjustment along all three axes with minimum labor being required to alter the rack configuration when it is desired to remove the rack mechanism and re-attach it to a differently configured pickup truck. To accomplish the foregoing, the rack construction must be lightweight while readily allowing adjustment in all three orthogonal directions.

2. Description of the Prior Art

The prior art discloses numerous racks for trucks and the like which are adjustable in differing manners. One patented rack is described in U.S. Pat. No. 2,947,566 issued to Tower on Aug. 2, 1960. This rack has means to adjust its size in two dimensions, width and height. The rack makes use of the stake pockets present on some trucks in order to mount it to the truck. The position of stake pockets on each particular model of truck are set, therefore limiting the positioning and shape of the rack on any particular make of truck to one configuration.

U.S. Pat. No. 3,475,046 issued to Webster and U.S. Pat. No. 4,211,448 issued to Weston likewise disclose racks that adjust in two dimensions. The Weston rack makes use of the stake pockets of the truck to mount the rack. This again allows for only one configuration per truck model. This means that once the rack is mounted to the truck, any adjustability to a different shape while mounted to that truck will be somewhat limited. In other words, it becomes impossible to reconfigure the rack to accommodate different loads once the rack has been installed on a truck. The known prior art taken singly or in combination is not seen as suggesting the unique construction of the instant invention.

None of the above inventions and patents, taken either singly or in combination, is seen to describe the instant invention as claimed.

SUMMARY OF THE INVENTION

By the present invention, an improved rack assembly for pickup trucks is presented and which includes rear and front sections each having upper and lower side rails as well as transverse cross members. By employing lightweight rectangular metal tubing, portions of the rails and cross members are telescopically interfitted such that the two sections may be longitudinally extended or retracted in order to accommodate truck beds of varying lengths. Likewise, the interfitting cross members permit adaptation to alternate bed widths. The upper rails extend forwardly of the front section to overlie the roof line of the truck cab and, through the adjustment of a plurality of uprights connecting the upper side rails to the lower side rails, this forwardly extending portion is assured of clearing variously configured cab roof lines. The enhanced usefulness of the present rack assembly is attributable to the ability to adjust all three axial dimensions while mounted to any model truck bed. The fixation of the assembly to the bed side walls avoids use of the stake pockets therein, so as to permit the longitudinal sliding of the rear section to and from the front section when making a length adjustment. This adjustment may be desired, even when the assembly is mounted upon any one single truck bed. When one desires to accommodate a large sized load, such as a gooseneck trailer that would overhang the rear portion of the rack could be slid far forward to ensure clearance for the trailer tongue. On the other hand, if one desired to transport an very long item, the rear portion of the rack could be hyperextended rearwardly beyond the rearmost extent of the truck bed. This kind of action is not possible with presently known truck racks.

Accordingly, it is a principle object of the present invention is to provide an improved truck rack assembly that is linearly adjustable in all three dimensions of length, width, and height.

Another object of the present invention is to provide a truck rack that is readily adjustable in size while mounted above or over the bed of a truck, thus allowing the temporary engagement of outside vehicles such as overhanging trailers or the hyperextension of the rack beyond the rear of the truck.

Another object of the present invention is to provide a truck rack that has lower rails attachable to side walls by means of angled base plates which are easily slidable along the upper surface of the side walls of the truck.

Another object of the present invention is to enhance the slideability of the angled base plates along the upper surface of the side walls of the truck by providing a low coefficient of friction pad on the lower surface of the base plates.

Another object of the present invention is to provide a truck rack having a rear section telescopically linearly displaceable relative a front section to achieve adjustment of the overall length of the rack, with each section further including interfitting components allowing of both vertical and transverse adjustment.

Another object of the present invention is to provide a truck rack permitting of 3-axis adjustment by means of telescopic tubing that serves the strengthen the frame in its contracted state.

Another object of the present invention is to provide a truck rack capable of easy on board length adjustment because of the use of pad mounts including a low coefficient of friction material.

Another object of the present invention is to provide a truck rack capable of hyperextension beyond the rearward extent of the pickup truck upon which it is mounted.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a rear elevation of the rack; and

FIG. 3A is a rear elevation of an alternate base plate embodiment; and

FIG. 4 is an enlarged, perspective view illustrating the telescopic interfitting of the rear and forward rack sections.

Similar reference characters denote corresponding features consistently throughout the attached drawings.

DETAILED DESCRIPTION OF THE PREFERRED EMBODIMENT

Figure 1:
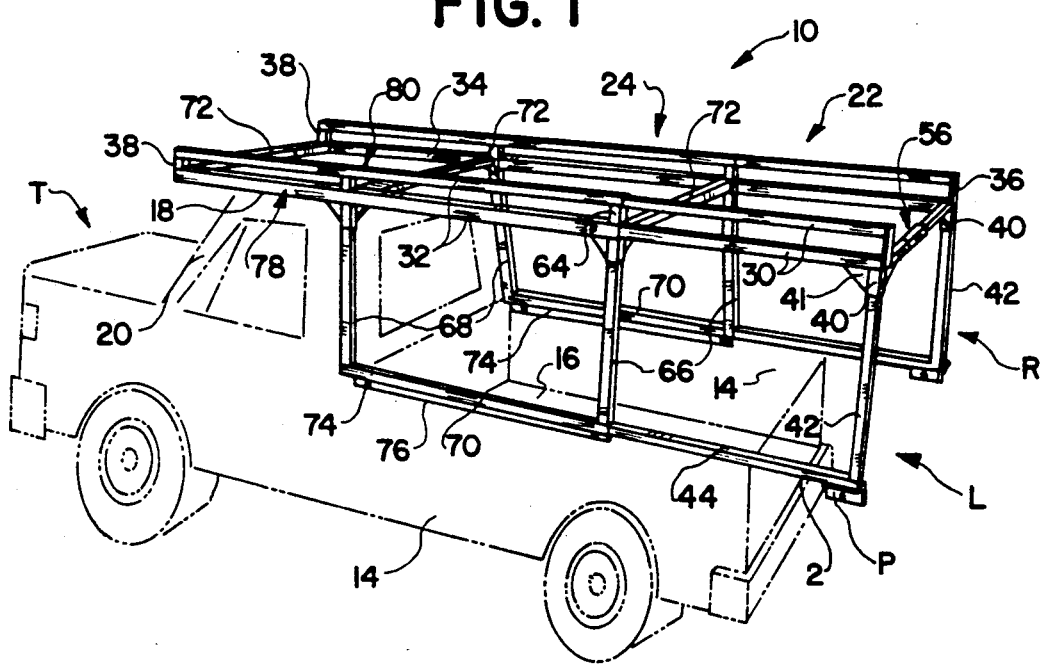
FIG. 1 is a perspective view of the present rack assembly as mounted upon a pickup truck.
Figure 2:
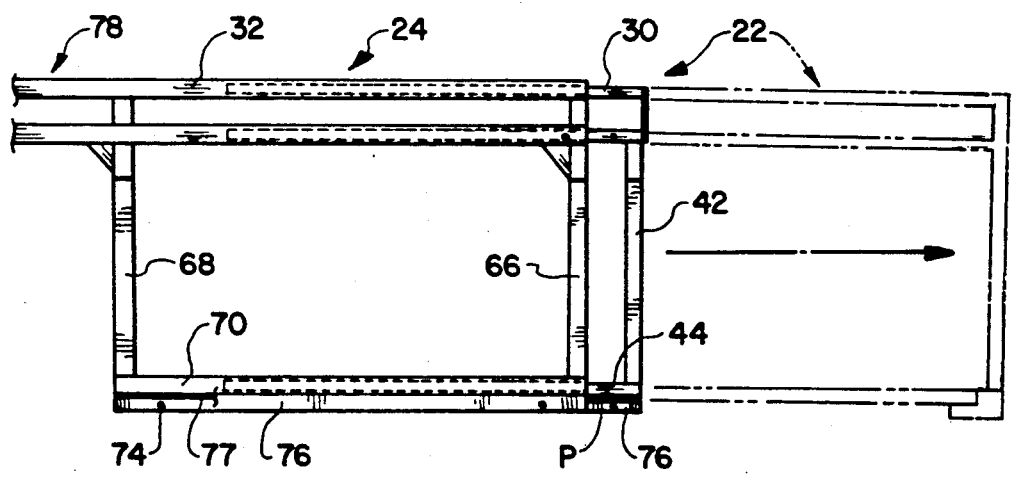
FIG. 2 is a partial elevation of the rack of FIG. 1, depicting in broken lines the rearwardly extendable feature.

Referring now to the drawings, particularly FIG. 1, the rack assembly 10 will be seen to comprise a framework constructed preferably of square or rectangular metal tubing and which is fully supported upon the top surfaces 12 of the two side walls 14 of a truck bed 16. The present assembly 10 finds particular merit when used with a pickup truck T and includes a forwardly extending top rack section adapted to overlie the roof 18 of the truck cab 20.

In order to accommodate the variety of truck bed dimensions as well as numerous cab configurations, means are provided to readily adjust the transverse width and longitudinal length of rack assembly 10 as well as the height of the top rack section so that a single basic form of the invention may be employed with any of variously configured pickup trucks. Additionally, by permitting of a forward displacement of the rear of the rack assembly, even after it has initially been installed, a user may accommodate oversize loads or a gooseneck trailer connection in the rear of the truck bed. This adaptation is achieved by providing a rear section 22, telescopically cooperating with a front section 24.

The principal components of the rack assembly are fabricated of square metal tubing. This of course does not preclude other polygonal tubing being used. The rear and front sections 22,24 each will be seen to include vertically spaced pairs of longitudinally extending upper side rails 30 and 32, respectively and which define the lateral limits of the top rack area 34. The rear portions of each pair of upper side rails 30,30 are affixed to one end plate 36 or the like while the front portions of each pair of upper side rails 32,32 are connected to another end plate 38. In the case of the rear section 22, an attachment fitting 40 is secured beneath the rear portions of the side rails 30,30 and each serves to telescopically receive a rear section upright 42.

The above referenced pair of uprights 42 provide support for the top rack area of the rear section and also allow for the selective vertical adjustment of the top rack area, with respect to a lower rail or plate 44 adapted to be disposed upon the top surface 12 of the truck bed side walls 14. This vertical adjustment may be accomplished in any of various ways. As shown in the left-hand portion of FIG. 3, the lower end 46 the upright 42 is secured, such as by welding, while the upper end 48 is telescopically inserted within the fitting 40 and retained by a fastener 50 passing through the mating components. As shown most clearly in FIG. 3, the fitting 40 is inclined outwardly from the upper rails at an angle of substantially 10-12 degrees and this angle carries through with the uprights 42. In this manner, a generally trapezoidal configuration if produced as shown in FIG. 3. To customize the height selection for a particular installation, the top of the two uprights may be cut off if necessary to lower the upper rails 30,30. Initially, the uprights may be provided with a plurality of vertically spaced holes to permit selective use according to the decided upon height.

Alternatively, an angularly disposed bottom socket fitting 52 may be welded to the lower rail 44 as in FIG. 3A, and a removable upright member 54 inserted between the bottom and top fittings and retained with fasteners 50. In this manner, a user may readily alter the height of the top rack area 34 by substituting various lengths of upright members 54. Both fittings 40 and 52 are preferably reinforced with the respective rails by means of a gusset 41 while the fittings 40 are also braced relative a cross member to be described, by means of the gussets 43.

The left and right hand units L and R of the above described rear section 22 are maintained in a laterally spaced apart relationship by means of transverse cross bracing, generally designated 56, spanning the two side units adjacent the end plates 36,36. Again, alternative means may be used to achieve lateral adjustability of the spacing between the side units L and R. Socket and/or stub fittings 58 attached to the same load or side rails 30 as the fittings 40, are directed in a horizontal plane to telescopically accept a cross-piece 60 either having stub portions insertable within the two opposed fittings 40,40 and retained by fasteners 62 passing therethrough or, by use of a pair of mating stub and socket elements. Alternate lateral spacing may be provided by substituting cross-pieces of various lengths, a variable length cross-piece per se or, by utilizing two telescopic members respectively secured to the left and right-hand units and having fastening means passing therethrough. FIG. 3 depicts an example of the latter arrangement.

The rear section 22 as described above cooperates with the front section 24 and which provides a telescopic interconnection between the two sections 22,24. In this respect, the pairs of upper rails 32 will be understood to be vertically spaced apart the same distance as the pairs of upper rails 30 and retained in this fixed spacing, by the end plate 38 and other tubing or spacer plates 64 as shown in FIG. 1. Each unit L and R of the front section 24 includes a pair of uprights 66,68 with the former disposed at the rear end of the front section and the latter approximately in the intermediate portion of the front section upper rails 32. The uprights 66,68 are preferably attached to the upper rails 32 and a common lower rail or plate 70, in the same manner as the uprights 42 of the rear section 22 and, a plurality of cross-pieces 72 likewise laterally join the two units L and R, in the same manner as the cross member 56.

The front rack section 24 is adapted to be mounted above the truck bed 16, immediately behind the cab 20 and the length of its lower rails or plates 70,70 is no less than 48 inches and preferably longer. In this manner, with the lower rails 44 of the rear section being say, 72 inches long, a substantial portion of the rear section lower rails 44 will is slidable within the interior of the front section lower rails 70, through various longitudinal adjustments of the rack assembly. The rear section upper rails 30 are preferably of the same length as the lower rails 44 and telescopically fit within the front section upper rails 32 so that as the rear section 22 is alternately pulled rearward or pushed forwardly, the overall length of the rack assembly is respectively increased or decreased. Pad members P, disposed at the rear lower portion of lower rails 40, provide support for the rear portion of the rack assembly in its normally used positions. In addition, the truck engaging portion of pad members P are affixed to or coated with a low coefficient of friction material such as "teflon" or the like to promote easy sliding from the retracted to the protracted position. As can clearly be seen in FIG. 1, the rear section can be hyperextended substantially beyond the end of the pickup truck bed if required. This hyperextension might be desirable to provide support for extremely long items of cargo occasionally hauled. It is understood that, during rearward hyperextension, the pickup truck tailgate may have to be first lowered to provide clearance for the portion of pad members P that normally rest inside pickup side walls 14.

One skilled in the art will recognize the crucial importance of the middle upright members 66 to this invention. Not only do they provide for overall structural rigidity, but they serve to prevent the entire rack from tipping rearwardly during the above mentioned hyperextension.

The rack sections 22,24 are respectively anchored to the top 12 of the truck side walls 14 by any suitable fastening means enabling fixation of both sections, regardless of the truck bed size and resultant extension or contraction, of the length and width of the rack assembly. The stake pockets normally in a pickup truck body are not utilized for anchoring the present assembly in view of the need to accommodate numerous bed sizes with a single assembly. Alternate fastening means may be used. For example, fasteners 74 may be passed horizontally into the truck body through flanges 76 carried by the lower rails 70 or, similar fasteners may be vertically passed through these rails and into the body surface 12. In any case, it will be desirable to include a layer 77 of low coefficient of friction padding or material intermediate the rack assembly and truck body to protect the vehicle body and facilitate the installation, removal and adjustment thereof as the components are slidably moved over the top of the side walls 14. Obviously, any flanges 76 on the rear section 22 should only be disposed adjacent the uprights 42 so as not to interfere with the collapse of the rear section into the front section.

To provide for the maximum length of the top rack area 34, the two pairs of upper rails 30 project forward of the uprights 68, as at 78, to provide a top rack overhang area 80 adapted to overlie the cab 20 of the truck. Although these projections 78 of the upper rails are illustrated as comprising integral extensions of the adjacent upper rails 32,32, they may alternately comprise separate tubular elements likewise telescopically adjustable joined to the remainder of the assembly.

With the above structure in mind, it will be appreciated that ready means are provided wherein a rack assembly may be quickly installed, removed or adjusted in any of three dimensions in order to appropriately conform to the size of a pickup truck bed and body, including the cab.

It is to be understood that the present invention is not limited to the sole embodiment described above, but encompasses any and all embodiments within the scope of the following claims.

I claim:

1. An adjustable truck rack assembly supported upon the side walls of a truck bed comprising;
    a front section including pairs of substantially parallel and vertically spaced apart upper and lower side rails with each said pair defining the forward portion of a frame side unit,
    forward and rearward uprights having opposite ends connecting each said upper and lower side rails of each said side unit,
    fittings on each said side unit removably receiving said uprights,
    adjustable transverse brace members spanning said frame side units between said upper side rails,
    a rear section including pairs of substantially parallel and vertically spaced apart upper and lower side rails with each said pair defining the rearward portion of a frame side unit,
    a pair of rearmost uprights having opposite ends connecting each said rear section upper and lower side rails of each said side unit,
    fittings on each said frame side unit of said rear section removably receiving said rearmost uprights,
    an adjustable transverse brace member spanning said rear section side units,
    said rails comprising tubular member; means for attaching said front section to said side walls; said front and rear section rails telescopically interfitting substantially along the entire length of said side rails of said rear section; means for repositioning said rear section an amount sufficient to overhang the rear of the truck bed in a fully extended position and to extend rearwardly over a portion of the truck bed in a fully telescoped position while said front section is attached to said side walls, and
    said upper rails of both frame side units projecting forwardly of said forward uprights to define an extended top rack portion adapted to overlie a truck cab, wherein;
    said frame side units are inclined inwardly toward one another at their tops.

2. An adjustable truck rack assembly according to claim 1 wherein said rails comprise rectangular tubing.

3. An adjustable truck rack assembly according to claim 1 including an adjustable transverse brace member spanning said upper rails of said extended top rack portion.

4. An adjustable truck rack assembly according to claim 1 wherein said front section lower side rails are at least 48 inches in length.

5. An adjustable truck rack assembly according to claim 1 wherein said front section lower side rails are supported upon the tops of the forward portions of said side walls of the truck by a padding material of a low coefficient of friction to facilitate ease of installation and prevent scratching the truck finish.

6. An adjustable truck rack assembly according to claim 1 wherein said fittings comprise socket members.

7. An adjustable truck rack assembly according to claim 1 wherein said frame side units are inclined inwardly toward one another an amount substantially between 10-12 degrees.

8. An adjustable truck rack assembly according to claim 1 wherein said rear section lower side rails further comprise pads of low coefficient of friction material which rest upon the truck side walls to facilitate ease of extension and retraction.

* * * * *